US011249723B2

(12) United States Patent
Ramesh

(10) Patent No.: US 11,249,723 B2
(45) Date of Patent: Feb. 15, 2022

(54) POSIT TENSOR PROCESSING

(71) Applicant: Micron Technology, Inc., Boise, ID (US)

(72) Inventor: Vijay S. Ramesh, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 152 days.

(21) Appl. No.: 16/838,138

(22) Filed: Apr. 2, 2020

(65) Prior Publication Data
US 2021/0311704 A1 Oct. 7, 2021

(51) Int. Cl.
G06F 7/544 (2006.01)
G06F 17/16 (2006.01)

(52) U.S. Cl.
CPC ........... *G06F 7/5443* (2013.01); *G06F 17/16* (2013.01)

(58) Field of Classification Search
CPC .............................. G06F 7/5443; G06F 17/16
USPC ....................................................... 708/523
See application file for complete search history.

(56) References Cited

U.S. PATENT DOCUMENTS 4,758,972 A 7/1988 Frazier
7,865,541 B1 1/2011 Langhammer
8,214,417 B2 7/2012 Ahmed
2020/0026498 A1* 1/2020 Sumbul ............... G06F 12/0246
2021/0124560 A1* 4/2021 Liu ....................... G06F 7/5277
2021/0143840 A1* 5/2021 Luo .................. H03M 13/6597

OTHER PUBLICATIONS

Gustafson, et al. "Beating Floating Point at its Own Game: Posit Arithmetic", Jan. 2017, retrieved from <http://www.johngustafson.net/pdfs/BeatingFloatingPoint.pdf>, 16 pages.
Nain, et al, "Multiplier-Accumulator (MAC) Unit", International Journal of Digital Application & Contemporary Research, vol. 5, Issue 2, Oct. 2016, 4 pages.

* cited by examiner

*Primary Examiner* — Tan V Mai
(74) *Attorney, Agent, or Firm* — Brooks, Cameron & Huebsch, PLLC

(57) ABSTRACT

A method related to posit tensor processing can include receiving, by a plurality of multiply-accumulator (MAC) units coupled to one another, a plurality of universal number (unum) or posit bit strings organized in a matrix and to be used as operands in a plurality of respective recursive operations performed using the plurality of MAC units and performing, using the MAC units, the plurality of respective recursive operations. Iterations of the respective recursive operations are performed using at least one bit string that is a same bit string as was used in a preceding iteration of the respective recursive operations. The method can further include prior to receiving the plurality of unum or posit bit strings, performing an operation to organize the plurality of unum or posit bit strings to achieve a threshold bandwidth ratio, a threshold latency, or both during performance of the plurality of respective recursive operations.

20 Claims, 6 Drawing Sheets

POSIT TENSOR PROCESSING

TECHNICAL FIELD

The present disclosure relates generally to semiconductor memory and methods, and more particularly, to apparatuses, systems, and methods for posit tensor processing.

BACKGROUND

Memory devices are typically provided as internal, semiconductor, integrated circuits in computers or other electronic systems. There are many different types of memory including volatile and non-volatile memory. Volatile memory can require power to maintain its data (e.g., host data, error data, etc.) and includes random access memory (RAM), dynamic random access memory (DRAM), static random access memory (SRAM), synchronous dynamic random access memory (SDRAM), and thyristor random access memory (TRAM), among others. Non-volatile memory can provide persistent data by retaining stored data when not powered and can include NAND flash memory, NOR flash memory, and resistance variable memory such as phase change random access memory (PCRAM), resistive random access memory (RRAM), and magnetoresistive random access memory (MRAM), such as spin torque transfer random access memory (STT RAM), among others.

Memory devices may be coupled to a host (e.g., a host computing device) to store data, commands, and/or instructions for use by the host while the computer or electronic system is operating. For example, data, commands, and/or instructions can be transferred between the host and the memory device(s) during operation of a computing or other electronic system.

DETAILED DESCRIPTION

Figure 1:
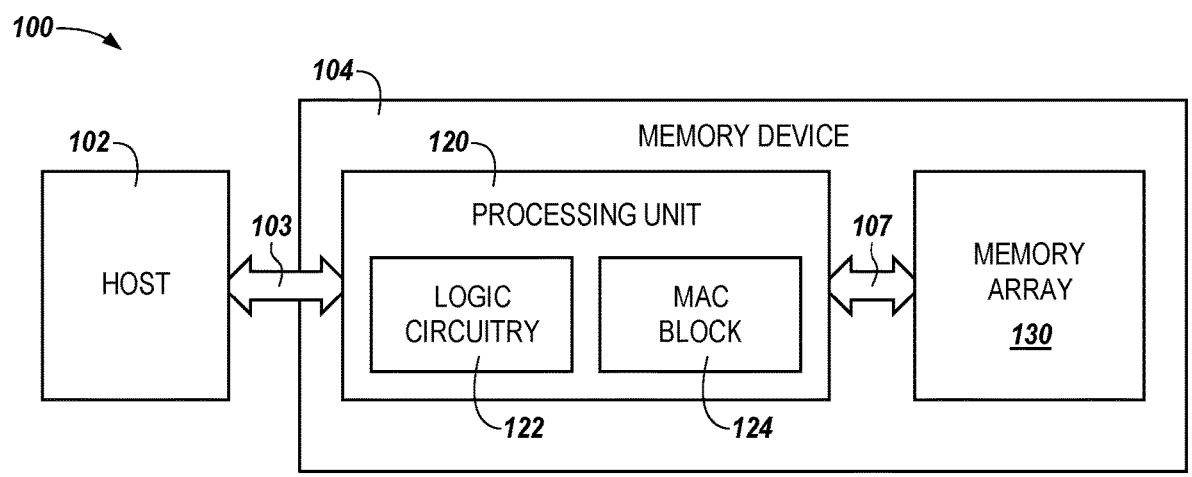
FIG. 1 is a functional block diagram in the form of an apparatus including a host and a memory device including a processing unit in accordance with a number of embodiments of the present disclosure.

Systems, apparatuses, and methods related to posit tensor processing are described. A method related to posit tensor processing can include receiving, by a plurality of multiply-accumulator (MAC) units coupled to one another, a plurality of universal number (unum) or posit bit strings organized in a matrix and to be used as operands in a plurality of respective recursive operations performed using the plurality of MAC units and performing, using the MAC units, the plurality of respective recursive operations, wherein iterations of the respective recursive operations are performed using at least one bit string that is a same bit string as was used in a preceding iteration of the respective recursive operations. The method can further include prior to receiving the plurality of unum or posit bit strings, performing an operation to organize the plurality of unum or posit bit strings to achieve a threshold bandwidth ratio, a threshold latency, or both during performance of the plurality of respective recursive operations.

Computing systems may perform a wide range of operations that can include various calculations, which can require differing degrees of accuracy. However, computing systems have a finite amount of memory in which to store operands on which calculations are to be performed. In order to facilitate performance of operation on operands stored by a computing system within the constraints imposed by finite memory resources, operands can be stored in particular formats. One such format is referred to as the "floating-point" format, or "float," for simplicity (e.g., the IEEE 754 floating-point format).

Under the floating-point standard, bit strings (e.g., strings of bits that can represent a number), such as binary number strings, are represented in terms of three sets of integers or sets of bits—a set of bits referred to as a "base," a set of bits referred to as an "exponent," and a set of bits referred to as a "mantissa" (or significand). The sets of integers or bits that define the format in which a binary number string is stored may be referred to herein as an "numeric format," or "format," for simplicity. For example, the three sets of integers of bits described above (e.g., the base, exponent, and mantissa) that define a floating-point bit string may be referred to as a format (e.g., a first format). As described in more detail below, a posit bit string may include four sets of integers or sets of bits (e.g., a sign, a regime, an exponent, and a mantissa), which may also be referred to as a "numeric format," or "format," (e.g., a second format). In addition, under the floating-point standard, two infinities (e.g., +∞ and −∞) and/or two kinds of "NaN" (not-a-number): a quiet NaN and a signaling NaN, may be included in a bit string.

The floating-point standard has been used in computing systems for a number of years and defines arithmetic formats, interchange formats, rounding rules, operations, and exception handling for computation carried out by many computing systems. Arithmetic formats can include binary and/or decimal floating-point data, which can include finite numbers, infinities, and/or special NaN values. Interchange formats can include encodings (e.g., bit strings) that may be used to exchange floating-point data. Rounding rules can include a set of properties that may be satisfied when rounding numbers during arithmetic operations and/or conversion operations. Floating-point operations can include arithmetic operations and/or other computational operations such as trigonometric functions. Exception handling can include indications of exceptional conditions, such as division by zero, overflows, etc.

An alternative format to floating-point is referred to as a "universal number" (unum) format. There are several forms of unum formats—Type I unums, Type II unums, and Type III unums, which can be referred to as "posits" and/or "valids." Type I unums are a superset of the IEEE 754 standard floating-point format that use a "ubit" at the end of the mantissa to indicate whether a real number is an exact float, or if it lies in the interval between adjacent floats. The sign, exponent, and mantissa bits in a Type I unum take their definition from the IEEE 754 floating-point format, however, the length of the exponent and mantissa fields of Type I unums can vary dramatically, from a single bit to a maximum user-definable length. By taking the sign, exponent, and mantissa bits from the IEEE 754 standard floating-point format, Type I unums can behave similar to floating-point numbers, however, the variable bit length exhibited in the exponent and fraction bits of the Type I unum can require additional management in comparison to floats.

Type II unums are generally incompatible with floats, however, Type II unums can permit a clean, mathematical design based on projected real numbers. A Type II unum can include n bits and can be described in terms of a "u-lattice" in which quadrants of a circular projection are populated with an ordered set of $2^{n-3}-1$ real numbers. The values of the Type II unum can be reflected about an axis bisecting the circular projection such that positive values lie in an upper right quadrant of the circular projection, while their negative counterparts lie in an upper left quadrant of the circular projection. The lower half of the circular projection representing a Type II unum can include reciprocals of the values that lie in the upper half of the circular projection. Type II unums generally rely on a look-up table for most operations. As a result, the size of the look-up table can limit the efficacy of Type II unums in some circumstances. However, Type II unums can provide improved computational functionality in comparison with floats under some conditions.

The Type III unum format is referred to herein as a "posit format" or, for simplicity, a "posit." In contrast to floating-point bit strings, posits can, under certain conditions, allow for higher precision (e.g., a broader dynamic range, higher resolution, and/or higher accuracy) than floating-point numbers with the same bit width. This can allow for operations performed by a computing system to be performed at a higher rate (e.g., faster) when using posits than with floating-point numbers, which, in turn, can improve the performance of the computing system by, for example, reducing a number of clock cycles used in performing operations thereby reducing processing time and/or power consumed in performing such operations. In addition, the use of posits in computing systems can allow for higher accuracy and/or precision in computations than floating-point numbers, which can further improve the functioning of a computing system in comparison to some approaches (e.g., approaches which rely upon floating-point format bit strings).

Posits can be highly variable in precision and accuracy based on the total quantity of bits and/or the quantity of sets of integers or sets of bits included in the posit. In addition, posits can generate a wide dynamic range. The accuracy, precision, and/or the dynamic range of a posit can be greater than that of a float, or other numerical formats, under certain conditions, as described in more detail herein. The variable accuracy, precision, and/or dynamic range of a posit can be manipulated, for example, based on an application in which a posit will be used. In addition, posits can reduce or eliminate the overflow, underflow, NaN, and/or other corner cases that are associated with floats and other numerical formats. Further, the use of posits can allow for a numerical value (e.g., a number) to be represented using fewer bits in comparison to floats or other numerical formats.

These features can, in some embodiments, allow for posits to be highly reconfigurable, which can provide improved application performance in comparison to approaches that rely on floats or other numerical formats. In addition, these features of posits can provide improved performance in machine learning applications in comparison to floats or other numerical formats. For example, posits can be used in machine learning applications, in which computational performance is paramount, to train a network (e.g., a neural network) with a same or greater accuracy and/or precision than floats or other numerical formats using fewer bits than floats or other numerical formats. In addition, inference operations in machine learning contexts can be achieved using posits with fewer bits (e.g., a smaller bit width) than floats or other numerical formats. By using fewer bits to achieve a same or enhanced outcome in comparison to floats or other numerical formats, the use of posits can therefore reduce an amount of time in performing operations and/or reduce the amount of memory space required in applications, which can improve the overall function of a computing system in which posits are employed.

Embodiments herein are directed to hardware circuitry (e.g., a processing unit that can include a multiplier-accumulator (MAC) block that can include multiple constituent MAC units) configured to perform various operations on bit strings to improve the overall functioning of a computing device. For example, embodiments herein are directed to hardware circuitry that is configured to perform recursive operations using bit strings that are formatted according to a universal number (unum) or posit format. In some embodiments, the bit strings can be organized in matrices or tensors prior to, during, or subsequent to performance of the recursive operation(s).

For example, the MAC block can be configured such that the constituent MAC units of the MAC block receive unum or posit bit strings organized in matrices or tensors and operate in concert to perform recursive operations using the bit string matrices or tensors to generate resultant bit string matrices or tensors. In some embodiments, the recursive operations can be performed by the constituent MAC units as part of performing a multiply-accumulate operation, however, as described in more detail herein, embodiments are not limited to performance of multiply-accumulate operations.

In some embodiments, prior to performance of the recursive operations, the bit strings can be converted from a first format (e.g., a floating-point format or a fixed-point format) that supports arithmetic or logical operations to a first level of precision to a second format (e.g., a universal number format, a posit format, etc.) that supports arithmetic or logical operations to a second level of precision. For example, a host may be configured to use bit strings that are formatted in a floating-point format or a fixed-point format and the processing unit may be configured to perform arithmetic and/or logical operations using bit strings that are formatted in the unum or posit format. Therefore, in order to utilize the processing unit to perform the recursive operations, the bit strings may be converted from the first format to the second format prior to performance of said operations.

As described in more detail herein, the processing unit can include circuitry and components that, when operated according to various control signals, can perform such operations on the converted bit strings. In some embodiments, the operations can be performed within the tensor processing unit without activating (e.g., prior to activating) input/output circuitry coupled to the processing unit. Accordingly, in some embodiments, the processing unit can be configured to perform the operations using the converted bit strings without transferring the bit strings out of the processing unit (e.g., to a host) until the requested operation is completed.

By performing such operations within processing unit using bit strings that have been covered to the second format, improved performance of the computing system may be realized by allowing for improved accuracy and/or precision in the performed operations, improved speed in performing the operations, and/or a reduced required storage space for bit strings prior to, during, or subsequent to, performance of recursive arithmetic and/or logical operations. In addition, by performing such operations within the processing unit, a quantity of signals asserted within the computing system can be reduced thereby decreasing power consumption and/or an amount of time spent in performing the operations in comparison to approaches that so not include the processing unit described herein.

In some embodiments, results (e.g., resultant bit strings) of the operations performed within the processing unit can be converted back to the first format (e.g., to a floating-point format), which can, in turn, be transferred to different circuitry (e.g., a host, a memory device, etc.) of the computing system.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and structural changes may be made without departing from the scope of the present disclosure.

As used herein, designators such as "N," "M," "X," and "Y," etc., particularly with respect to reference numerals in the drawings, indicate that a number of the particular feature so designated can be included. It is also to be understood that the terminology used herein is for the purpose of describing particular embodiments only, and is not intended to be limiting. As used herein, the singular forms "a," "an," and "the" can include both singular and plural referents, unless the context clearly dictates otherwise. In addition, "a number of," "at least one," and "one or more" (e.g., a number of memory banks) can refer to one or more memory banks, whereas a "plurality of" is intended to refer to more than one of such things.

Furthermore, the words "can" and "may" are used throughout this application in a permissive sense (i.e., having the potential to, being able to), not in a mandatory sense (i.e., must). The term "include," and derivations thereof, means "including, but not limited to." The terms "coupled" and "coupling" mean to be directly or indirectly connected physically or for access to and movement (transmission) of commands and/or data, as appropriate to the context. The terms "bit strings," "data," and "data values" are used interchangeably herein and can have the same meaning, as appropriate to the context. In addition, the terms "set of bits," "bit sub-set," and "portion" (in the context of a portion of bits of a bit string) are used interchangeably herein and can have the same meaning, as appropriate to the context.

The figures herein follow a numbering convention in which the first digit or digits correspond to the figure number and the remaining digits identify an element or component in the figure. Similar elements or components between different figures may be identified by the use of similar digits. For example, 120 may reference element "20" in FIG. 1, and a similar element may be referenced as 220 in FIG. 2. A group or plurality of similar elements or components may generally be referred to herein with a single element number. For example, a plurality of reference elements 226-1 to 226-N (e.g., 226-1, 226-2, 226-3, . . . , 226-N may be referred to generally as 226. As will be appreciated, elements shown in the various embodiments herein can be added, exchanged, and/or eliminated so as to provide a number of additional embodiments of the present disclosure. In addition, the proportion and/or the relative scale of the elements provided in the figures are intended to illustrate certain embodiments of the present disclosure and should not be taken in a limiting sense.

FIG. 1 is a functional block diagram in the form of an apparatus including a host 102 and a memory device 104 including a processing unit 120 in accordance with a number of embodiments of the present disclosure. As used herein, an "apparatus" can refer to, but is not limited to, any of a variety of structures or combinations of structures, such as a circuit or circuitry, a die or dice, a module or modules, a device or devices, or a system or systems, for example. The memory device 104 can include a one or more memory modules (e.g., single in-line memory modules, dual in-line memory modules, etc.). The memory device 104 can include volatile memory and/or non-volatile memory. In a number of embodiments, memory device 104 can include a multi-chip device. A multi-chip device can include a number of different memory types and/or memory modules. For example, a memory system can include non-volatile or volatile memory on any type of a module.

As shown in FIG. 1, the apparatus 100 can include a processing unit 120, which can include logic circuitry 122 and a multiply-accumulator (MAC) block 124, and a memory array 130. In addition, each of the components (e.g., the host 102, the processing unit 120, the logic circuitry 122, the MAC block 124, and/or the memory array 130 can be separately referred to herein as an "apparatus." The logic circuitry 122 may be referred to as a "processing device" or "processing unit" herein.

The memory device 104 can provide main memory for the computing system 100 or could be used as additional memory or storage throughout the computing system 100. The memory device 104 can include one or more memory arrays 130 (e.g., arrays of memory cells), which can include volatile and/or non-volatile memory cells. The memory array 130 can be a flash array with a NAND architecture, for example. Embodiments are not limited to a particular type of memory device. For instance, the memory device 104 can include RAM, ROM, DRAM, SDRAM, PCRAM, RRAM, and flash memory, among others.

In embodiments in which the memory device 104 includes non-volatile memory, the memory device 104 can include flash memory devices such as NAND or NOR flash memory devices. Embodiments are not so limited, however, and the memory device 104 can include other non-volatile memory devices such as non-volatile random-access memory devices (e.g., NVRAM, ReRAM, FeRAM, MRAM, PCM), "emerging" memory devices such as resistance variable (e.g., 3-D Crosspoint (3D XP)) memory devices, memory devices that include an array of self-selecting memory (SSM) cells, etc., or combinations thereof. Resistance variable memory devices can perform bit storage based on a change of bulk resistance, in conjunction with a stackable cross-gridded data access array. Additionally, in contrast to many flash-based memories, resistance variable non-volatile memory can perform a write in-place operation, where a non-volatile memory cell can be programmed without the non-volatile memory cell being previously erased. In contrast to flash-based memories and resistance variable memories, self-selecting memory cells can include memory cells that have a single chalcogenide material that serves as both the switch and storage element for the memory cell.

As illustrated in FIG. 1, a host 102 can be coupled to the memory device 104. In a number of embodiments, the memory device 104 can be coupled to the host 102 via one or more channels (e.g., channel 103). In FIG. 1, the memory device 104 is coupled to the host 102 via channel 103 and the processing unit 120 of the memory device 104 is coupled to the memory array 130 via a channel 107. The host 102 can be a host system such as a personal laptop computer, a desktop computer, a digital camera, a smart phone, a memory card reader, and/or an internet-of-things (IoT) enabled device, among various other types of hosts.

The host 102 can include a system motherboard and/or backplane and can include a memory access device, e.g., a processor (or processing device). One of ordinary skill in the art will appreciate that "a processor" can intend one or more processors, such as a parallel processing system, a number of coprocessors, etc. The system 100 can include separate integrated circuits or both the host 102, the memory device 104, and the memory array 130 can be on the same integrated circuit. The system 100 can be, for instance, a server system and/or a high-performance computing (HPC) system and/or a portion thereof. Although the example shown in FIG. 1 illustrate a system having a Von Neumann architecture, embodiments of the present disclosure can be implemented in non-Von Neumann architectures, which may not include one or more components (e.g., CPU, ALU, etc.) often associated with a Von Neumann architecture The memory device 104, which is shown in more detail in FIG. 2, herein, can include the processing unit 120, which can include logic circuitry 122 and a MAC block 124. The processing unit 120 can be provided in the form of an integrated circuit, such as an application-specific integrated circuit (ASIC), field programmable gate array (FPGA), system-on-a-chip, etc., while the logic circuitry 122 can be provided in the form of a reduced instruction set computing device (RISC), advanced RISC machine, or other combination of hardware and/or circuitry that is configured to perform operations described in more detail, herein. In some embodiments, the logic circuitry 122 can comprise one or more processors (e.g., processing device(s), processing unit(s), etc.).

The logic circuitry 122 can cause operations using bit strings received by the processing unit 120 to be performed. In some embodiments, the logic circuitry can orchestrate operations on the bit strings to convert the bit strings between various formats and/or cause the converted bit strings to be transferred to the memory array 130. For example, the conversion operations can include operations to convert floating-point bit strings (e.g., floating-point numbers) to bit strings in a posit format, and vice versa. Once the floating-point bit strings are converted to bit strings in the posit format, the processing unit 120 (e.g., the MAC block 124 of the processing unit 120) can be configured to perform (or cause performance of) arithmetic operations such as addition, subtraction, multiplication, division, fused multiply addition, multiply-accumulate, dot product units, greater than or less than, absolute value (e.g., FABS( )), fast Fourier transforms, inverse fast Fourier transforms, sigmoid function, convolution, square root, exponent, and/or logarithm operations, and/or recursive logical operations such as AND, OR, XOR, NOT, etc., as well as trigonometric operations such as sine, cosine, tangent, etc. using the posit bit strings. In some embodiments, such operations can be performed recursively. As will be appreciated, the foregoing list of operations is not intended to be exhaustive, nor is the foregoing list of operations intended to be limiting, and the processing unit 120 may be configured to perform (or cause performance of) other arithmetic, bitwise, and/or logical operations.

The memory device 104 can further include a memory resource, which can be communicatively coupled to the processing unit 120. The memory resource can include volatile memory resource, non-volatile memory resources, or a combination of volatile and non-volatile memory resources. In some embodiments, the memory resource can be a random-access memory (RAM) such as static random-access memory (SRAM). Embodiments are not so limited, however, and the memory resource can be a cache, one or more registers, NVRAM, ReRAM, FeRAM, MRAM, PCM), "emerging" memory devices such as resistance variable memory resources, phase change memory devices, memory devices that include arrays of self-selecting memory cells, etc., or combinations thereof.

The memory resource can store one or more bit strings. Subsequent to performance of operations using the processing unit 120, the bit string(s) stored by the memory resource can be stored according to a universal number (unum) or posit format. As used herein, the bit string stored in the unum (e.g., a Type III unum) or posit format can include several sub-sets of bits or "bit sub-sets." For example, a universal number or posit bit string can include a bit sub-set referred to as a "sign" or "sign portion," a bit sub-set referred to as a "regime" or "regime portion," a bit sub-set referred to as an "exponent" or "exponent portion," and a bit sub-set referred to as a "mantissa" or "mantissa portion" (or significand). As used herein, a bit sub-set is intended to refer to a sub-set of bits included in a bit string. Examples of the sign, regime, exponent, and mantissa sets of bits are described in more detail in connection with FIGS. 3 and 4A-4B, herein. Embodiments are not so limited, however, and the memory resource can store bit strings in other formats, such as the floating-point format, or other suitable formats.

In some embodiments, the processing unit 120 can receive data comprising a bit string having a first format that provides a first level of precision (e.g., a floating-point bit string). The processing unit 120 can receive the data from the memory resource and convert (e.g., using the conversion circuitry 225-1 to 225-N illustrated in FIG. 2B) the bit string to a second format that provides a second level of precision that is different from the first level of precision (e.g., a universal number or posit format). The first level of precision can, in some embodiments, be lower than the second level of precision. For example, if the first format is a floating-point format and the second format is a universal number or posit format, the floating-point bit string may provide a lower level of precision under certain conditions than the universal number or posit bit string, as described in more detail in connection with FIGS. 3 and 4A-4B, herein.

The first format can be a floating-point format (e.g., an IEEE 754 format) and the second format can be a universal number (unum) format (e.g., a Type I unum format, a Type II unum format, a Type III unum format, a posit format, a valid format, etc.). As a result, the first format can include a mantissa, a base, and an exponent portion, and the second format can include a mantissa, a sign, a regime, and an exponent portion.

The processing unit 120 can be configured to perform an arithmetic operation or a logical operation, or both, using the bit string having the second format (e.g., a unum or posit format). In some embodiments, the arithmetic operation and/or the logical operation can be a recursive operation. As used herein, a "recursive operation" generally refers to an operation that is performed a specified quantity of times where a result of a previous iteration of the recursive operation is used an operand for a subsequent iteration of the operation. For example, a recursive multiplication operation can be an operation in which two bit string operands, β and φ are multiplied together and the result of each iteration of the recursive operation is used as a bit string operand for a subsequent iteration. Stated alternatively, a recursive operation can refer to an operation in which a first iteration of the recursive operation includes multiplying β and φ together to arrive at a result λ (e.g., β×φ=λ). The next iteration of this example recursive operation can include multiplying the result λ by φ to arrive at another result ω (e.g., λ×φ=ω).

Another illustrative example of a recursive operation can be explained in terms of calculating the factorial of a natural number. This example, which is given by Equation 1 can include performing recursive operations when the factorial of a given number, n, is greater than zero and returning unity if the number n is equal to zero:

$$\text{fact}(n) = \begin{cases} 1 & \text{if } n = 0 \\ n \times \text{fact}(n-1) & \text{if } n > 0 \end{cases} \quad \text{Equation 1}$$

As shown in Equation 1, a recursive operation to determine the factorial of the number n can be carried out until n is equal to zero, at which point the solution is reached and the recursive operation is terminated. For example, using Equation 1, the factorial of the number n can be calculated recursively by performing the following operations: n×(n−1)×(n−2)× . . . ×1.

Yet another example of a recursive operation is a multiply-accumulate operation in which an accumulator, a is modified at iteration according to the equation a←a+(b×c). In a multiply-accumulate operation, each previous iteration of the accumulator a is summed with the multiplicative product of two operands b and c. Examples of recursive operations contemplated herein are not limited to these examples. To the contrary, the above examples of recursive operations are merely illustrative and are provided to clarify the scope of the term "recursive operation" in the context of the disclosure.

The embodiment of FIG. 1 can include additional circuitry that is not illustrated so as not to obscure embodiments of the present disclosure. For example, the memory device 104 can include address circuitry to latch address signals provided over I/O connections through I/O circuitry. Address signals can be received and decoded by a row decoder and a column decoder to access the memory device 104 and/or the memory array 130. It will be appreciated by those skilled in the art that the number of address input connections can depend on the density and architecture of the memory device 104 and/or the memory array 130.

Figure 2A:
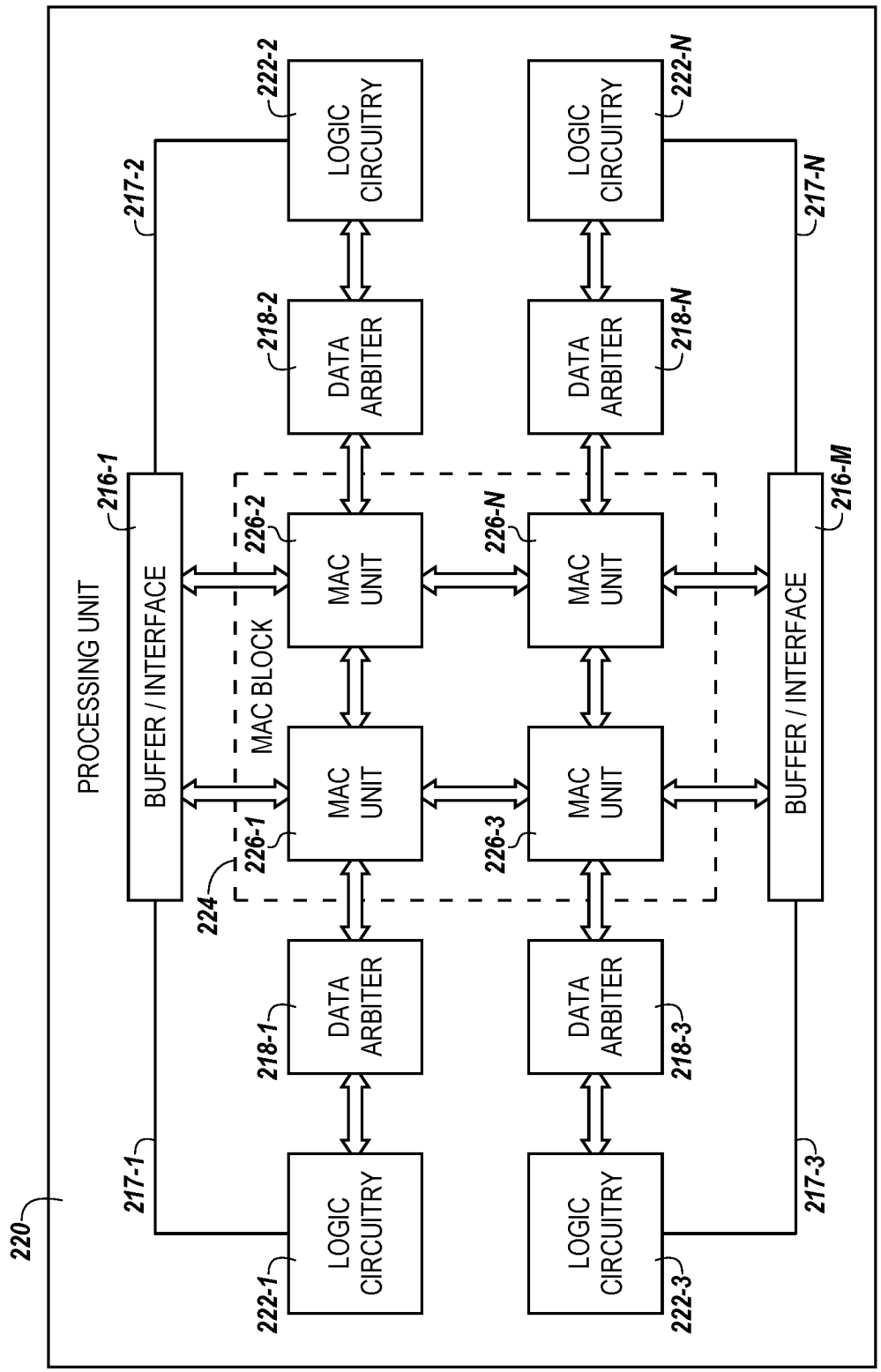
FIG. 2A is a functional block diagram in the form of a processing unit including a multiplier-accumulator block in accordance with a number of embodiments of the present disclosure.

FIG. 2A is a functional block diagram in the form of a processing unit 220 including a multiplier-accumulator block 224 in accordance with a number of embodiments of the present disclosure. The processing unit 220 and the multiplier-accumulator (MAC) block 224 can be analogous to the processing unit 120 and the MAC block 124 illustrated in FIG. 1.

As shown in FIG. 2A, the processing unit 220 can include logic circuitry 222-1 to 222-N (which can be analogous to the logic circuitry 122 illustrated in FIG. 1), a plurality of data arbiters 218-1 to 218-N, and a plurality of buffers/interfaces 216-1 to 216-M. In addition, the MAC block 224 can include a plurality of MAC units 226-1 to 226-N.

Although shown as internal to the processing unit 220, the buffers/interfaces 216-1 to 216-M can be external to the processing unit 220. In such embodiments, the buffers/interfaces 216-1 to 216-M can be coupled to the processing unit 220 via a communication path such as a double data rate (DDR) bus, a peripheral component interconnect express (PCIe) bus, or other suitable bus.

The logic circuitry 222-1 to 222-N can be communicatively coupled to the buffer/interface 216-1 to 216-M via respective communication paths 217-1 to 217-N. The communication paths 217-1 to 217-N can allow for direct communication (e.g., for the exchange of commands) between the logic circuitry 222-1 to 222-N and the buffer(s)/interface(s) 216-1 to 216-M.

The MAC units 226-1 to 226-N can be configured to perform arithmetic and/or logical operations as part of digital signal processing to perform a recursive operation using bit string operands. As described above, the bit string operands can be unum or posit bit string operands and can be organized in a matrix or tensor prior to being received by the MAC units 226-1 to 226-N. The MAC units 226-1 to 226-N can include circuitry to facilitate performance of arithmetic and/or logical operations to perform multiply-accumulate (among other) operations using the unum or posit bit string operands.

In some embodiments, the MAC units 226-1 to 226-N can each be configured to accommodate 64-bits by 64-bits (e.g., bit string matrices or tensors having 64 columns and 64 rows of data values), although embodiments are not limited to this particular example. For example, embodiments described herein can include MAC units 226-1 to 226-N that can be configured to accommodate 8-bits by 8-bits, 16-bits by 16-bits, 32-bits by 32-bits, or any other quantity of bits. In some embodiments, the MAC units 226-1 to 226-N can be reconfigurable such that they can include a first quantity of bits during performance of some operations and a second quantity of bits for other operations. For example, the MAC units 226-1 to 226-N can be configured to accommodate 8-bits by 8-bits for certain operations and can be reconfigured at a subsequent time to accommodate 64-bits by 64-bits.

In embodiments in which the MAC units 226-1 to 226-N are configured to accommodate 64-bits by 64-bits, the MAC block 224 can be configured to include multiple MAC units 226-1 to 226-N such that the MAC block 224 can accommodate 128-bits by 128-bits. For example, in the example shown in FIG. 2A, the MAC block 224 includes four MAC units 226-1 to 226-N, which when spatially configured in a grid formation (as shown in FIG. 2A) provides accommodation of 128-bits by 128-bits. As used herein, a "grid formation" generally refers to a condition in which components are arranged such that top edges and side edges of respective components align with one another. For example, in the grid formation shown in FIG. 2A, the top edges of the MAC units 226-1 and 226-2 align with one another and the top edges of the MAC units 226-3 and 226-N align with one another. In addition, side edges of the MAC units 226-1 and 226-3 align with one another and side edge of the MAC units 226-3 and 226-N align with one another.

In some embodiments, each MAC unit 226-1 to 226-N can include 8-bit inputs and/or outputs, 16-bit inputs and/or outputs, 32-bit inputs and/or outputs, etc. The bit strings (e.g., the unum or posit bit strings that are used as operands for operations performed within the processing unit 220) can be streamed through the MAC block 224 during performance of the operations. For example, the bit strings can be continuously (or near continuously) processed by the MAC block 224 during performance of a recursive operation, such as a multiply-accumulate operation.

The bit strings can be processed by the data arbiters 218-1 to 218-N prior to being received by the MAC block 224. The data arbiters 218-1 to 218-N can be configured to organize the bit strings to optimize bandwidth and/or latency associated with performing the operations using the MAC block 224. That is, in contrast to approaches that do not provide data arbiters to organize the bit strings prior to performing operations using the bit strings, embodiments herein can allow for the bit strings to be organized to optimize bandwidth and/or latency parameters associated with performing the operations. This can lead to an improvement in throughput of operations performed using the MAC block 224 in comparison to approaches that do not optimize the content of the bit strings prior to performing operations using the bit strings. In some embodiments, the data arbiters 218-1 to 218-N can be systolic data arbiters.

As used herein, the term "systolic" refers to a condition in which data, such as bit strings, flows or streams through a computing device, such as the processing unit 220. For example, embodiments herein can include providing bit strings to the MAC block 224, and hence, the MAC units 226-1 to 226-N in a systolic fashion such that the bit strings flow or are streamed to the MAC block 224 continuously in the absence of intermediate commands subsequent to issuance of a command to initiate performance of a recursive operation using the MAC block 224. Accordingly, a "systolic data arbiter" refers to a hardware device that allocates access to shared computing resources in a systolic fashion (e.g., a hardware device that allocates access to shared computing resources in a flowing or streaming manner).

The operations performed by the MAC block 224 can be controlled by assertion of commands and/or control signals to the MAC units 226-1 to 226-N of the MAC block 224. The commands and/or control signals can be asserted on the MAC block 224 via the buffer/interface(s) 216-1 to 216-M. Accordingly, in some embodiments, the commands and/or control signals can be asserted on the MAC block 224 along a first lateral dimension of the MAC block 224 (e.g., from the top and/or bottom of the MAC block 224 as shown in FIG. 2A) and the bit strings can be streamed into the MAC block 224 along a second lateral dimension of the MAC block 224 (e.g., along the sides of the MAC block 224 as shown in FIG. 2A).

Figure 2B:
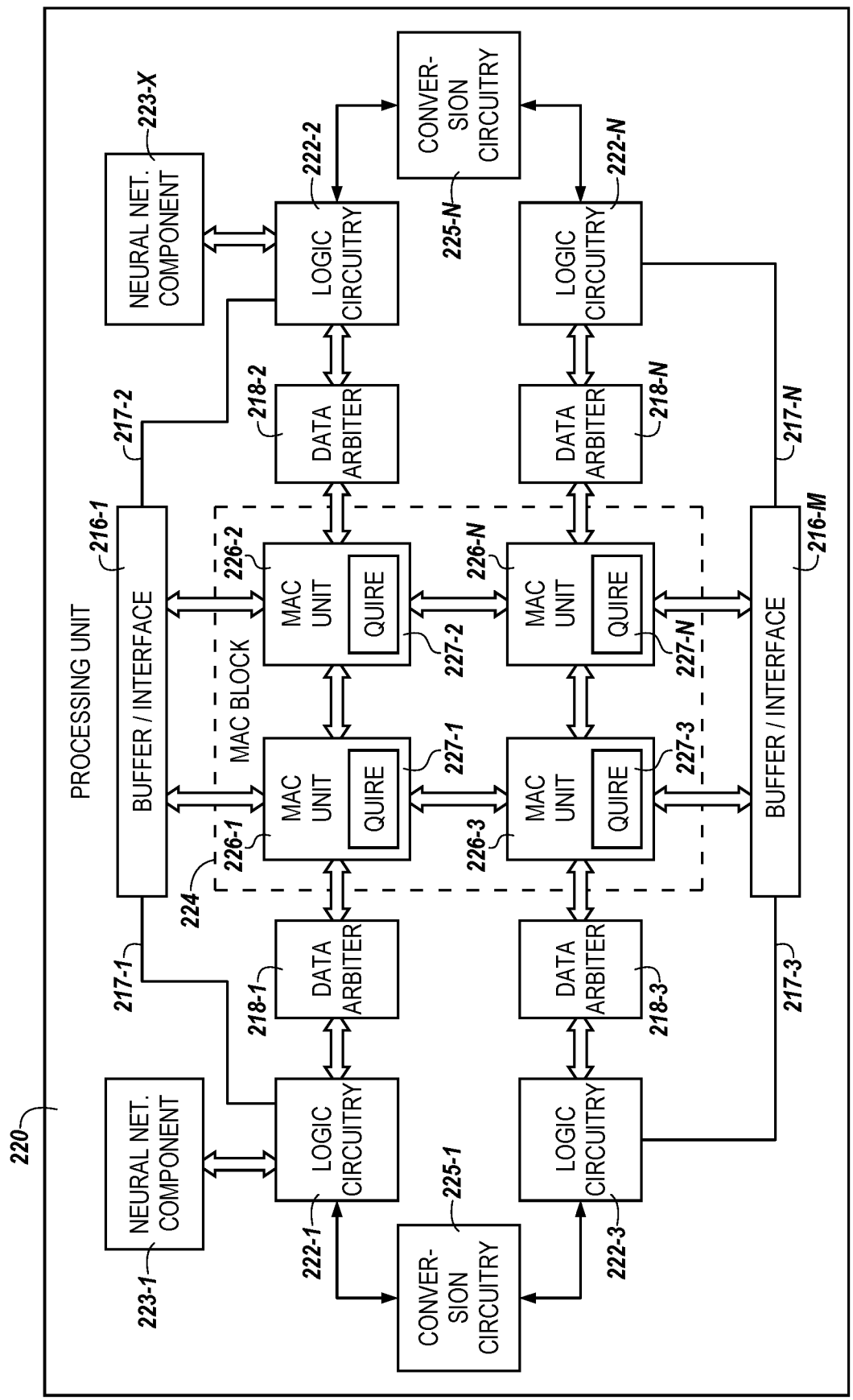
FIG. 2B is another functional block diagram in the form of a processing unit including a multiplier-accumulator block in accordance with a number of embodiments of the present disclosure.

FIG. 2B is another functional block diagram in the form of a processing unit 220 including a multiplier-accumulator block 224 in accordance with a number of embodiments of the present disclosure. The processing unit 220 and the multiplier-accumulator (MAC) block 224 can be analogous to the processing unit 120 and the MAC block 124 illustrated in FIG. 1.

As shown in FIG. 2B, the processing unit 220 can include logic circuitry 222-1 to 222-N (which can be analogous to the logic circuitry 122 illustrated in FIG. 1), a plurality of data arbiters 218-1 to 218-N, and a plurality of buffers/interfaces 216-1 to 216-M. In addition, the MAC block 224 can include a plurality of MAC units 226-1 to 226-N, which can each include respective quire registers 227-1 to 227-N. In addition, the processing unit 220 can include conversion circuitry 225-1 to 225-N and/or neural network components 223-1 to 223-X.

The quire registers 227-1 to 227-N, which can be referred to in the alternative herein as "accumulator registers," or "registers," for simplicity can include sense amplifiers, flip-flops, or other storage locations configured to store data values. In some embodiments, the quire registers 227-1 to 227-N can be configured to store results of iterations of the recursive operations performed by the MAC block 224. The results of the iterations can be accumulated for each stage of the recursive operation. This can allow for a result of the recursive operation to be stored that has not been rounded or truncated, which is common in some other approaches. By storing the un-rounded results of iterations in the quire registers 227-1 to 227-N, however, the accuracy of the final result of the recursive operation can be greater than in approaches that perform roundings or truncations on results of iterations of the recursive operations.

As shown in FIG. 2B, the processing unit 220 can include neural network components 223-1 to 223-X. The neural network components 223-1 to 223-X can be coupled to the logic circuitry and can perform neural network operations such as convolution, activation, pooling, and/or normalization operations on bit strings (e.g., unum or posit bit strings organized in matrices or tensors) that are to be the subject of recursive operations performed by the MAC block 224.

The processing unit 220 can further include conversion circuitry 225-1 to 225-N. The conversion circuitry 225-2 to 225-N can be configured to perform conversion operations on bit strings received by the processing unit 220 prior to performance of recursive operations by the MAC block 224. For example, as described above, a host, such as the host 102 illustrated in FIG. 1, can use bit strings that are formatted according to a floating-point or fixed-point format, whereas the processing unit 220 can perform operations using bit strings formatted according to a unum or posit format. In order to convert the bit strings from the floating-point or fixed-point format to the unum or posit format, the conversion circuitry 225-1 to 225-N can perform one or more conversion operations to convert the bit strings to the unum or posit format prior to commencement of recursive operations using the MAC block 224.

In a non-limiting example, the MAC block 224 can be a posit MAC block and can include a plurality of MAC units 226-1 to 226-N, which are organized in a grid formation. As used herein, a "posit MAC block" refers to a MAC block that is configured to perform operations using operands that are formatted in a unum or posit format, as opposed to a floating-point format or other format. The posit MAC block can be resident on an application-specific integrated circuit (ASIC) or a field-programmable gate array (FPGA). As used herein, the term "resident on" refers to something that is physically located on a particular component. For example, the posit MAC block being "resident on" an ASIC or FPGA refers to a condition in which the posit MAC block is physically located on an ASIC or FPGA. The term "resident on" can be used interchangeably with other terms such as "deployed on" or "located on," herein.

In some embodiments, the MAC block 224 can be configured to perform a plurality of matrix operations as part of performance of the respective recursive operations using the received bit strings. For example, in embodiments in which the bit strings are provided in the form of matrices or tensors, the MAC block 224 can be configured to perform addition, subtraction, multiplication, and/or division operations on using the matrices or tensors.

The MAC units 226-1 to 226-N can be configured to receive commands via an interface (e.g., the buffer/interface 216-1 to 216-M) that resides along a first lateral dimension of the posit MAC block 224. The commands to cause performance of respective recursive operations can include commands to perform the respective recursive operations using universal number or posit bit strings that are organized in a matrix or a tensor.

The plurality of MAC units 226-1 to 226-N can be configured to receive the bit strings along a second lateral dimension of the posit MAC block, the second lateral dimension being substantially orthogonal to the first lateral dimension and perform the respective recursive operations using the received bit strings. In some embodiments, iterations of the respective recursive operations can be performed using at least one bit string that is a same bit string as was used in a preceding iteration of the respective recursive operations. By using at least one same unum or posit bit string as an operand for multiple recursions of the respective recursive operations, a quantity of signals and/or function calls to retrieve the unum or posit bit strings can be reduced in comparison to approaches in which different bit strings are used for successive iteration of the respective recursive operations.

In some embodiments, the MAC block 224 can be configured to receive the bit strings in a streaming manner and perform the respective recursive operations using the bit strings as the bit strings are streamed through the MAC block 224. For example, the bit strings can be streamed through the logic circuitry 222-1 to 222-N and/or through the data arbiters 218-1 to 218-N continuously during performance of the respective recursive operations such that the MAC block 224 receives the bit strings continuously (or near-continuously) in the absence of intermediate commands (e.g., commands to initiate each recursive operation separately). Embodiments are not so limited, however, and in some embodiments, the bit strings can be loaded into the MAC block 224 on rising and/or falling edges of a clock signal that can be asserted on the MAC block 224 to control timing of operations performed by the MAC block 224.

A data arbiter 218-1 to 218-N can be coupled to the MAC block 224 and can be configured to organize the bit strings to achieve a threshold bandwidth ratio, a threshold latency, or both during performance of the plurality of respective recursive operations. For example, the data arbiter 218-1 to 218-N can be configured to perform operations to organize the bit strings to optimize a distribution of the bit strings, reduce a quantity of data associated with the bit strings, simplify the bit strings, or otherwise organize the bit strings to optimize at least one parameter associated with performance of the recursive operations by the MAC block 224.

In some embodiments, the MAC block 224 can further include comprises an accumulator register (e.g., the quire registers 227-1 to 227-N) configured to store an intermediate result corresponding to at least one iteration of the respective recursive operations. The accumulator register can include two hundred fifty-six (256) storage locations to store an intermediate result of the respective recursive operations that contains two hundred fifty-six bits or less, although embodiments are not so limited and the accumulator register can include greater than or fewer than two hundred fifty-six storage locations. By storing intermediate results of the respective recursive operations in the accumulator register(s), a level of accuracy in the final results of the respective recursive operations can be maintained in contrast to approaches that simply round or truncate intermediate results of recursive operations.

In another non-limiting example, a plurality of posit multiplier-accumulator (MAC) units 226-1 to 226-N can be deployed on an application-specific integrated circuit or a field-programmable gate array. The MAC units 226-1 to 226-N can be provisioned with processing resources (either internally or communicatively) and coupled to one another in a grid formation. The MAC units 226-1 to 226-N can include respective quire registers 227-1 to 227-N, which can be coupled to each of the MAC units 226-1 to 226-N. In some embodiments, each MAC unit among the plurality of MAC units 226-1 to 226-N can be configured to receive bit strings formatted according to a universal number format or a posit format and organized in a matrix.

The MAC units 226-1 to 226-N can further be configured to perform a recursive operation using the received bit strings as operands for the recursive operation and cause results of iterations of the recursive operation to be accumulated in the respective quire registers 227-1 to 227-N. In some embodiments, the MAC units 226-1 to 226-N can be configured to determine that the recursive operation is complete and generate a final result of the recursive operation using a result of a final iteration of the recursive operation, a result of an iteration stored in the respective quire registers 227-1 to 227-N, or both.

For example, because the final result of the recursive operation can be accumulated in the quire registers 227-1 to 227-N, the final result of the recursive operation can be retrieved from the respective quire registers 227-1 to 227-N. However, in some embodiments, the final result of the recursive operation stored in the quire registers 227-1 to 227-N may include greater than a desired quantity of bits due to the size of the respective quire registers 227-1 to 227-N. If this is the case, the MAC units 226-1 to 226-N and/or the logic circuitry 222-1 to 222-N can be configured to round or truncate the final result of the recursive operation to a predetermined quantity of bits.

In some embodiments, a respective systolic data arbiter (e.g., the data arbiters 218-1 to 218-N) can be coupled to each of the MAC units 226-1 to 226-N. In this example, each of the respective systolic data arbiters can be configured to perform operations to organize the bit strings to optimize a bandwidth parameter corresponding to supply of the bit strings to the MAC units 226-1 to 226-N. In some embodiments, the bandwidth parameter can correspond to a maximum rate of data transfer through the MAC units 226-1 to 226-N during performance of the recursive operation(s).

The MAC units 226-1 to 226-N can be configured to receive commands to cause performance of the recursive operation via an interface that resides along a first lateral dimension of the MAC units 226-1 to 226-N and receive the bit strings along a second lateral dimension of the MAC units 226-1 to 226-N. In some embodiments, the second lateral dimension can be substantially orthogonal to the first lateral dimension. For example, commands can be asserted to the MAC units 226-1 to 226-N via the buffer/interface(s) 216-1 to 216-M, which lie on a top or bottom portion of the MAC units 226-1 to 226-N as oriented in FIG. 2B, while the bit strings can be streamed into the MAC units 226-1 to 226-N via the logic circuitry 222-1 to 222-N and/or the data arbiters 218-1 to 218-N, which lie along side portions of the MAC units 226-1 to 226-N as oriented in FIG. 2B.

In some embodiments, at least one of the processing resources can be configured to determine a size of the matrix and, responsive to the size of the matrix being greater than a threshold size, perform an operation to simplify the matrix such that a resulting matrix is less than the threshold size prior to the plurality of MAC units 226-1 to 226-N performing the recursive operation. For example, if the MAC units 226-1 to 226-N are each configured to perform operations on 64-bit by 64-bit matrices or tensors and the bit strings are initially provided in a matrix or tensor that is greater than 64-bits by 64-bits, at least one processing resource can perform operations to manipulate the matrices or tensors such that they contain, at most, 64-bits by 64-bits.

The MAC units 226-1 to 226-N can be configured to perform multiple iterations of the recursive operation using at least one bit string that is the same as a preceding iterations of the recursive operation. For example, the MAC units 226-1 to 226-N can reuse a same bit string for multiple iterations of the recursive operation. By reusing at least one bit string as an operand for multiple recursions of the respective recursive operations, a quantity of signals and/or function calls to retrieve the bit strings can be reduced in comparison to approaches in which different bit strings are used for successive iteration of the respective recursive operations.

Figure 3:
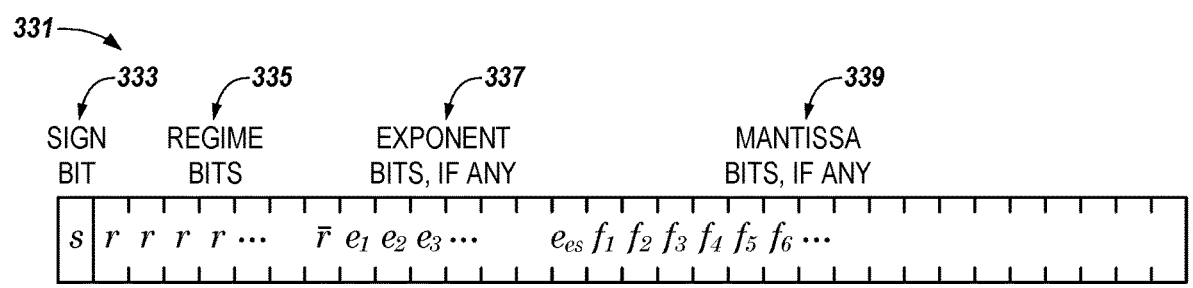
FIG. 3 is an example of an n-bit post with es exponent bits.

FIG. 3 is an example of an n-bit universal number, or "unum" with es exponent bits. In the example of FIG. 3, the n-bit unum is a posit bit string 331. As shown in FIG. 3, the n-bit posit 331 can include a set of sign bit(s) (e.g., a first bit sub-set or a sign bit sub-set 333), a set of regime bits (e.g., a second bit sub-set or the regime bit sub-set 335), a set of exponent bits (e.g., a third bit sub-set or an exponent bit sub-set 337), and a set of mantissa bits (e.g., a fourth bit sub-set or a mantissa bit sub-set 339). The mantissa bits 339 can be referred to in the alternative as a "fraction portion" or as "fraction bits," and can represent a portion of a bit string (e.g., a number) that follows a decimal point.

The sign bit 333 can be zero (0) for positive numbers and one (1) for negative numbers. The regime bits 335 are described in connection with Table 1, below, which shows (binary) bit strings and their related numerical meaning, k. In Table 1, the numerical meaning, k, is determined by the run length of the bit string. The letter x in the binary portion of Table 1 indicates that the bit value is irrelevant for determination of the regime, because the (binary) bit string is terminated in response to successive bit flips or when the end of the bit string is reached. For example, in the (binary) bit string 0010, the bit string terminates in response to a zero flipping to a one and then back to a zero. Accordingly, the last zero is irrelevant with respect to the regime and all that is considered for the regime are the leading identical bits and the first opposite bit that terminates the bit string (if the bit string includes such bits).

TABLE 1

| Binary | 0000 | 0001 | 001X | 01XX | 10XX | 110X | 1110 | 1111 |
|---|---|---|---|---|---|---|---|---|
| Numerical (k) | −4 | −3 | −2 | −1 | 0 | 1 | 2 | 3 |

In FIG. 3, the regime bits 335 $r$ correspond to identical bits in the bit string, while the regime bits 335 $\bar{r}$ correspond to an opposite bit that terminates the bit string. For example, for the numerical k value −2 shown in Table 1, the regime bits r correspond to the first two leading zeros, while the regime bit(s) $\bar{r}$ correspond to the one. As noted above, the final bit corresponding to the numerical k, which is represented by the X in Table 1 is irrelevant to the regime.

If m corresponds to the number of identical bits in the bit string, if the bits are zero, k=−m. If the bits are one, then k=m−1. This is illustrated in Table 1 where, for example, the (binary) bit string 10XX has a single one and k=m−1=1−1=0. Similarly, the (binary) bit string 0001 includes three zeros so k=−m=−3. The regime can indicate a scale factor of useed*, where useed=$2^{2^{es}}$. Several example values for used are shown below in Table 2.

TABLE 2

| es | 0 | 1 | 2 | 3 | 4 |
|---|---|---|---|---|---|
| used | 2 | $2^2 = 4$ | $4^2 = 16$ | $16^2 = 256$ | $256^2 = 65536$ |

The exponent bits 337 correspond to an exponent e, as an unsigned number. In contrast to floating-point numbers, the exponent bits 337 described herein may not have a bias associated therewith. As a result, the exponent bits 337 described herein may represent a scaling by a factor of $2^e$. As shown in FIG. 3, there can be up to es exponent bits ($e_1, e_2, e_3, \ldots, e_{es}$), depending on how many bits remain to right of the regime bits 335 of the n-bit posit 331. In some embodiments, this can allow for tapered accuracy of the n-bit posit 331 in which numbers which are nearer in magnitude to one have a higher accuracy than numbers which are very large or very small. However, as very large or very small numbers may be utilized less frequent in certain kinds of operations, the tapered accuracy behavior of the n-bit posit 331 shown in FIG. 3 may be desirable in a wide range of situations.

The mantissa bits 339 (or fraction bits) represent any additional bits that may be part of the n-bit posit 331 that lie to the right of the exponent bits 337. Similar to floating-point bit strings, the mantissa bits 339 represent a fraction f which can be analogous to the fraction 1.f where f includes one or more bits to the right of the decimal point following the one. In contrast to floating-point bit strings, however, in the n-bit posit 331 shown in FIG. 3, the "hidden bit" (e.g., the one) may always be one (e.g., unity), whereas floating-point bit strings may include a subnormal number with a "hidden bit" of zero (e.g., 0.f).

As described herein, alter a numerical value or a quantity of bits of one of more of the sign 333 bit sub-set, the regime 335 bit sub-set, the exponent 337 bit sub-set, or the mantissa 339 bit sub-set can vary the precision of the n-bit posit 331. For example, changing the total number of bits in the n-bit posit 331 can alter the resolution of the n-bit posit bit string 331. That is, an 8-bit posit can be converted to a 16-bit posit by, for example, increasing the numerical values and/or the quantity of bits associated with one or more of the posit bit string's constituent bit sub-sets to increase the resolution of the posit bit string. Conversely, the resolution of a posit bit string can be decreased for example, from a 64-bit resolution to a 32-bit resolution by decreasing the numerical values and/or the quantity of bits associated with one or more of the posit bit string's constituent bit sub-sets.

In some embodiments, altering the numerical value and/or the quantity of bits associated with one or more of the regime 335 bit sub-set, the exponent 337 bit sub-set, and/or the mantissa 339 bit sub-set to vary the precision of the n-bit posit 331 can lead to an alteration to at least one of the other of the regime 335 bit sub-set, the exponent 337 bit sub-set, and/or the mantissa 339 bit sub-set. For example, when altering the precision of the n-bit posit 331 to increase the resolution of the n-bit posit bit string 331 (e.g., when performing an "up-convert" operation to increase the bit width of the n-bit posit bit string 331), the numerical value and/or the quantity of bits associated with one or more of the regime 335 bit sub-set, the exponent 337 bit sub-set, and/or the mantissa 339 bit sub-set may be altered.

In a non-limiting example in which the resolution of the n-bit posit bit string 331 is increased (e.g., the precision of the n-bit posit bit string 331 is varied to increase the bit width of the n-bit posit bit string 331) but the numerical value or the quantity of bits associated with the exponent 337 bit sub-set does not change, the numerical value or the quantity of bits associated with the mantissa 339 bit sub-set may be increased. In at least one embodiment, increasing the numerical value and/or the quantity of bits of the mantissa 339 bit sub-set when the exponent 338 bit sub-set remains unchanged can include adding one or more zero bits to the mantissa 339 bit sub-set.

In another non-limiting example in which the resolution of the n-bit posit bit string 331 is increased (e.g., the precision of the n-bit posit bit string 331 is varied to increase the bit width of the n-bit posit bit string 331) by altering the numerical value and/or the quantity of bits associated with the exponent 337 bit sub-set, the numerical value and/or the quantity of bits associated with the regime 335 bit sub-set and/or the mantissa 339 bit sub-set may be either increased or decreased. For example, if the numerical value and/or the quantity of bits associated with the exponent 337 bit sub-set is increased or decreased, corresponding alterations may be made to the numerical value and/or the quantity of bits associated with the regime 335 bit sub-set and/or the mantissa 339 bit sub-set. In at least one embodiment, increasing or decreasing the numerical value and/or the quantity of bits associated with the regime 335 bit sub-set and/or the mantissa 339 bit sub-set can include adding one or more zero bits to the regime 335 bit sub-set and/or the mantissa 339 bit sub-set and/or truncating the numerical value or the quantity of bits associated with the regime 335 bit sub-set and/or the mantissa 339 bit sub-set.

In another example in which the resolution of the n-bit posit bit string 331 is increased (e.g., the precision of the n-bit posit bit string 331 is varied to increase the bit width of the n-bit posit bit string 331), the numerical value and/or the quantity of bits associated with the exponent 335 bit sub-set may be increased and the numerical value and/or the quantity of bits associated with the regime 333 bit sub-set may be decreased. Conversely, in some embodiments, the numerical value and/or the quantity of bits associated with the exponent 335 bit sub-set may be decreased and the numerical value and/or the quantity of bits associated with the regime 333 bit sub-set may be increased.

In a non-limiting example in which the resolution of the n-bit posit bit string 331 is decreased (e.g., the precision of the n-bit posit bit string 331 is varied to decrease the bit width of the n-bit posit bit string 331) but the numerical value or the quantity of bits associated with the exponent 337 bit sub-set does not change, the numerical value or the quantity of bits associated with the mantissa 339 bit sub-set may be decreased. In at least one embodiment, decreasing the numerical value and/or the quantity of bits of the mantissa 339 bit sub-set when the exponent 338 bit sub-set remains unchanged can include truncating the numerical value and/or the quantity of bits associated with the mantissa 339 bit sub-set.

In another non-limiting example in which the resolution of the n-bit posit bit string 331 is decreased (e.g., the precision of the n-bit posit bit string 331 is varied to decrease the bit width of the n-bit posit bit string 331) by altering the numerical value and/or the quantity of bits associated with the exponent 337 bit sub-set, the numerical value and/or the quantity of bits associated with the regime 335 bit sub-set and/or the mantissa 339 bit sub-set may be either increased or decreased. For example, if the numerical value and/or the quantity of bits associated with the exponent 337 bit sub-set is increased or decreased, corresponding alterations may be made to the numerical value and/or the quantity of bits associated with the regime 335 bit sub-set and/or the mantissa 339 bit sub-set. In at least one embodiment, increasing or decreasing the numerical value and/or the quantity of bits associated with the regime 335 bit sub-set and/or the mantissa 339 bit sub-set can include adding one or more zero bits to the regime 335 bit sub-set and/or the mantissa 339 bit sub-set and/or truncating the numerical value or the quantity of bits associated with the regime 335 bit sub-set and/or the mantissa 339 bit sub-set.

In some embodiments, changing the numerical value and/or a quantity of bits in the exponent bit sub-set can alter the dynamic range of the n-bit posit 331. For example, a 32-bit posit bit string with an exponent bit sub-set having a numerical value of zero (e.g., a 32-bit posit bit string with es=0, or a (32,0) posit bit string) can have a dynamic range of approximately 18 decades. However, a 32-bit posit bit string with an exponent bit sub-set having a numerical value of 3 (e.g., a 32-bit posit bit string with es=3, or a (32,3) posit bit string) can have a dynamic range of approximately 145 decades.

Figure 4A:
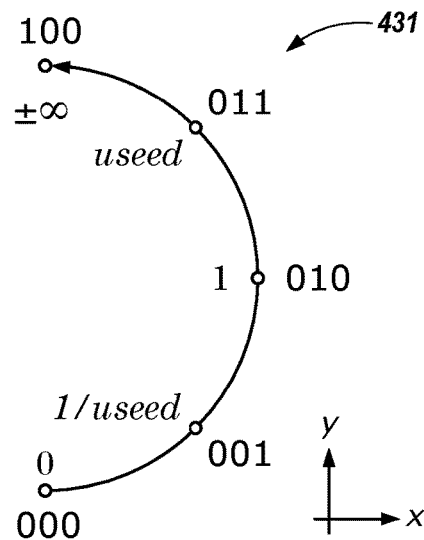
FIG. 4A is an example of positive values for a 3-bit posit.

FIG. 4A is an example of positive values for a 3-bit posit. In FIG. 4A, only the right half of projective real numbers, however, it will be appreciated that negative projective real numbers that correspond to their positive counterparts shown in FIG. 4A can exist on a curve representing a transformation about they-axis of the curves shown in FIG. 4A.

Figure 4B:
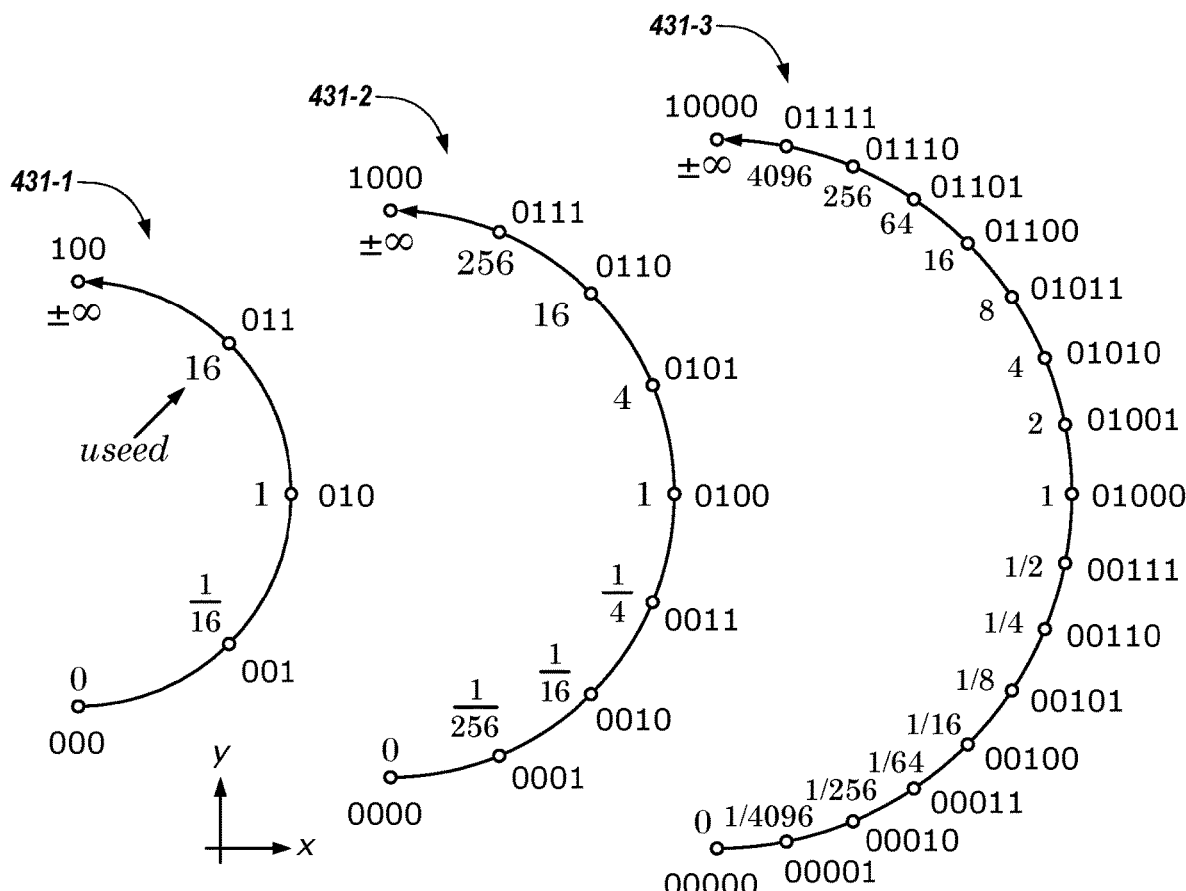
FIG. 4B is an example of posit construction using two exponent bits.

In the example of FIG. 4A, es=2, so useed=$2^{2^{es}}$=16. The precision of a posit 431-1 can be increased by appending bits the bit string, as shown in FIG. 4B. For example, appending a bit with a value of one (1) to bit strings of the posit 431-1 increases the accuracy of the posit 431-1 as shown by the posit 431-2 in FIG. 4B. Similarly, appending a bit with a value of one to bit strings of the posit 431-2 in FIG. 4B increases the accuracy of the posit 431-2 as shown by the posit 431-3 shown in FIG. 4B. An example of interpolation rules that may be used to append bits to the bits strings of the posits 431-1 shown in FIG. 4A to obtain the posits 431-2, 431-3 illustrated in FIG. 4B follow.

If maxpos is the largest positive value of a bit string of the posits 431-1, 431-2, 431-3 and minpos is the smallest value of a bit string of the posits 431-1, 431-2, 431-3, maxpos may be equivalent to useed and minpos may be equivalent to $$\frac{1}{useed}.$$

Between maxpos and ±∞, a new bit value may be maxpos*useed, and between zero and minpos, a new bit value may be $$\frac{minpos}{useed}.$$

These new bit values can correspond to a new regime bit 335. Between existing values x=$2^m$ and y=$2^n$, where m and n differ by more than one, the new bit value may be given by the geometric mean:

$$\sqrt{x \times y} = 2^{\frac{(m+n)}{2}},$$

which corresponds to a new exponent bit 337. If the new bit value is midway between the existing x and y values next to it the new bit value can represent the arithmetic mean $$\frac{x+y}{2},$$

which corresponds to a new mantissa bit 339.

FIG. 4B is an example of posit construction using two exponent bits. In FIG. 4B, only the right half of projective real numbers, however, it will be appreciated that negative projective real numbers that correspond to their positive counterparts shown in FIG. 4B can exist on a curve representing a transformation about the y-axis of the curves shown in FIG. 4B. The posits 431-1, 431-2, 431-3 shown in FIG. 4B each include only two exception values: Zero (0) when all the bits of the bit string are zero and ±∞ when the bit string is a one (1) followed by all zeros. It is noted that the numerical values of the posits 431-1, 431-2, 431-3 shown in FIG. 4 are exactly useed*. That is, the numerical values of the posits 431-1, 431-2, 431-3 shown in FIG. 4 are exactly useed to the power of the k value represented by the regime (e.g., the regime bits 335 described above in connection with FIG. 3). In FIG. 4B, the posit 431-1 has es=2, so useed=$2^{2^{es}}$=16, the posit 431-2 has es=3, so useed=$2^{2^{es}}$=256, and the posit 431-3 has es=4, so useed=$2^{2^{es}}$=4096.

As an illustrative example of adding bits to the 3-bit posit 431-1 to create the 4-bit posit 431-2 of FIG. 4B, the useed=256, so the bit string corresponding to the useed of 256 has an additional regime bit appended thereto and the former useed, 16, has a terminating regime bit (r̄) appended thereto. As described above, between existing values, the corresponding bit strings have an additional exponent bit appended thereto. For example, the numerical values $\frac{1}{16}$, $\frac{1}{4}$, 1, and 4 will have an exponent bit appended thereto. That is, the final one corresponding to the numerical value 4 is an exponent bit, the final zero corresponding to the numerical value 1 is an exponent bit, etc. This pattern can be further seen in the posit 431-3, which is a 5-bit posit generated according to the rules above from the 4-bit posit 431-2. If another bit was added to the posit 431-3 in FIG. 4B to generate a 6-bit posit, mantissa bits 339 would be appended to the numerical values between $\frac{1}{16}$ and 16.

A non-limiting example of decoding a posit (e.g., a posit 431) to obtain its numerical equivalent follows. In some embodiments, the bit string corresponding to a posit p is an unsigned integer ranging from $-2^{n-1}$ to $2^{n-1}$, k is an integer corresponding to the regime bits 335 and e is an unsigned integer corresponding to the exponent bits 337. If the set of mantissa bits 339 is represented as $\{f_1, f_2 \ldots f_{fs}\}$ and f is a value represented by 1. $f_1 f_2 \ldots f_{fs}$ (e.g., by a one followed by a decimal point followed by the mantissa bits 339), the p can be given by Equation 2, below.

$$x = \begin{cases} 0, & p = 0 \\ \pm\infty, & p = -2^{n-1} \\ \text{sign}(p) \times \textit{useed}^k \times 2^e \times f, & \text{all other } p \end{cases} \quad \text{Equation 2}$$

A further illustrative example of decoding a posit bit string is provided below in connection with the posit bit string 0000110111011101 shown in Table 3, below follows.

TABLE 3

| SIGN | REGIME | EXPONENT | MANTISSA |
|------|--------|----------|----------|
| 0    | 0001   | 101      | 11011101 |

In Table 3, the posit bit string 0000110111011101 is broken up into its constituent sets of bits (e.g., the sign bit 333, the regime bits 335, the exponent bits 337, and the mantissa bits 339). Since es=3 in the posit bit string shown in Table 3 (e.g., because there are three exponent bits), useed=256. Because the sign bit 333 is zero, the value of the numerical expression corresponding to the posit bit string shown in Table 3 is positive. The regime bits 335 have a run of three consecutive zeros corresponding to a value of −3 (as described above in connection with Table 1). As a result, the scale factor contributed by the regime bits 335 is $256^{-3}$ (e.g., useed*). The exponent bits 337 represent five (5) as an unsigned integer and therefore contribute an additional scale factor of $2^e = 2^5 = 32$. Lastly, the mantissa bits 339, which are given in Table 3 as 11011101, represent two-hundred and twenty-one (221) as an unsigned integer, so the mantissa bits 339, given above as f are $$f + \frac{221}{256}.$$

Using these values and Equation 2, the numerical value corresponding to the posit bit string given in Table 3 is $$+256^{-3} \times 2^5 \times \left(1 + \frac{221}{256}\right) = \frac{437}{134217728} \approx 3.55393 \times 10^{-6}.$$

Figure 5:
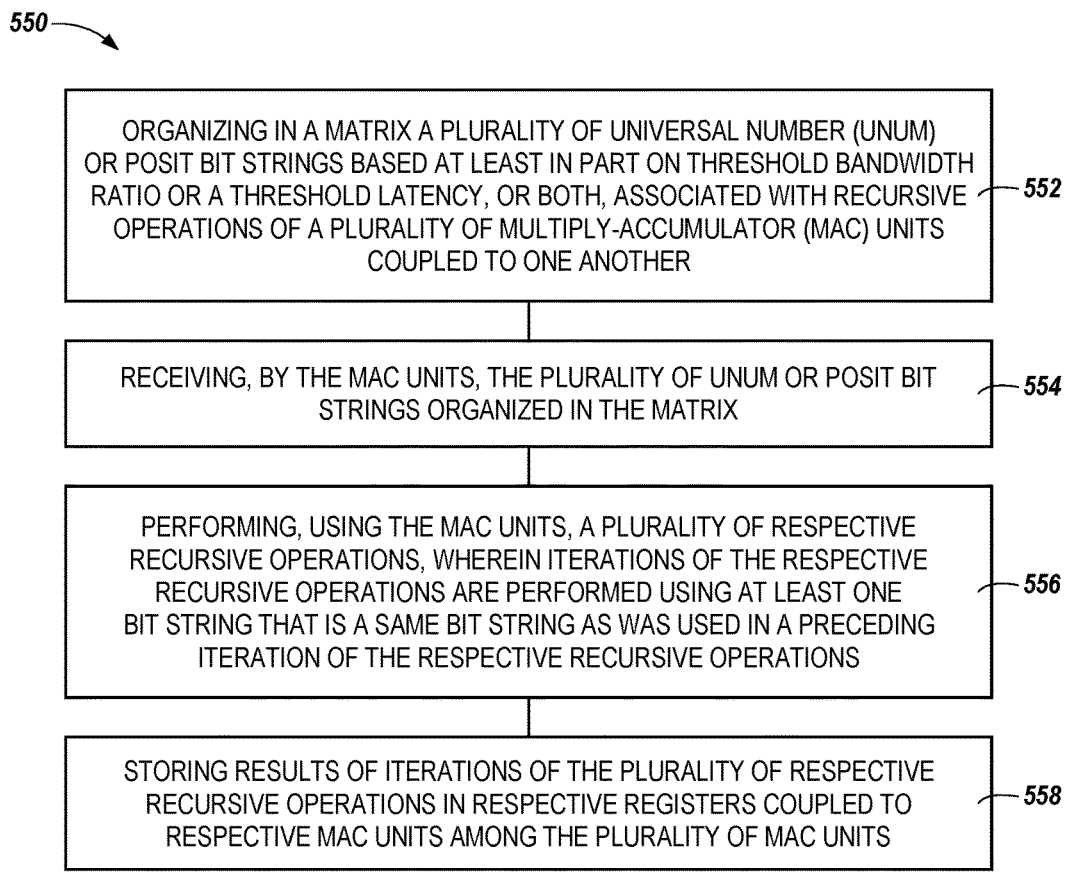
FIG. 5 is a flow diagram representing an example method for posit tensor processing in accordance with a number of embodiments of the present disclosure.

FIG. 5 is a flow diagram representing an example method 550 for operating a processing unit for posit operations in accordance with a number of embodiments of the present disclosure. At block 552 the method 550 can include organizing in a matrix a plurality of universal number (unum) or posit bit strings based at least in part on threshold bandwidth ratio or a threshold latency, or both, associated with recursive operations of a plurality of multiply-accumulator (MAC) units coupled to one another. The MAC units can be analogous to the MAC units 226-1 to 226-N illustrated in FIGS. 2A and 2B, herein. The threshold bandwidth and/or the threshold latency can correspond to a desired throughput and/or processing speed at which the recursive operations are to be performed. In some embodiments, the operation to organize the unum or posit bit strings can be performed by respective data arbiters (e.g., the data arbiters 218-1 to 218-N illustrated in FIGS. 2A and 2B, herein) coupled to respective MAC units.

In some embodiments, the MAC units can include circuitry configured to perform the respective recursive operations and are resident on an application-specific integrated circuit or a field-programmable gate array. In addition, as described above, the MAC units can be organized in a grid formation with respect to one another.

At block 554, the method 550 can include receiving, by the MAC, the plurality of unum or posit bit strings organized in the matrix prior to receiving the unum or posit bit strings.

At block 556, the method 550 can include performing, using the MAC units, a plurality of respective recursive operations, wherein iterations of the respective recursive operations are performed using at least one bit string that is a same bit string as was used in a preceding iteration of the respective recursive operations. For example, the method 550 can include using at least one same unum or posit bit string as an operand for multiple recursions of the respective recursive operations. By using at least one same unum or posit bit string as an operand for multiple recursions of the respective recursive operations, a quantity of signals and/or function calls to retrieve the unum or posit bit strings can be reduced in comparison to approaches in which different bit strings are used for successive iteration of the respective recursive operations.

In some embodiments, the method 550 can include performing at least a portion of the recursive operations substantially concurrently. As used herein, the term "substantially" intends that the characteristic needs not be absolute, but is close enough so as to achieve the advantages of the characteristic. For example, "substantially concurrently" is not limited to operations that are performed absolutely concurrently and can include timings that are intended to be concurrent but due to manufacturing limitations may not be precisely concurrently. For example, due to read/write delays that may be exhibited by various interfaces of the processing unit, the portion of the recursive operations that are performed "substantially concurrently" may not start or finish at exactly the same time. For example, a first and second portion of the recursive operations may be performed such they are being performed at the same time regardless if one of the first and second portion of the recursive operations commences or terminates prior to the other.

In some embodiments, the method 550 can include performing the respective recursive operations by performing sub-operations associated with the respective recursive operations by different MAC units among the plurality of MAC units. For example, a first MAC unit (e.g., the MAC unit 226-1 illustrated in FIGS. 2A and 2B, herein) can perform a first sub-operation associated with performance of a recursive operation and a second MAC unit (e.g. the MAC unit 226-2 illustrated in FIGS. 2A and 2B, herein) can perform a second sub-operation associated with performance of a recursive operation.

At block 558, the method 550 can include storing results of iterations of the plurality of respective recursive operations in respective registers coupled to respective MAC units among the plurality of MAC units. The results of the iterations of the respective recursive operations can be stored in registers associated with the MAC units, such as the quire registers 227-1 to 227-N illustrated in FIG. 2B, herein.

In some embodiments, the method 550 can include receiving, by the MAC units, commands asserted to a first physical portion of the respective MAC units that resides along a first lateral dimension of the MAC units and receiving the unum or posit bit strings by a second physical portion of the respective MAC units that resides along a second lateral dimension of the MAC units. The first lateral dimension and the second lateral dimension can be substantially orthogonal to one another. For example, the commands can be asserted via the buffers/interfaces 216-1 to 216-M illustrated in FIGS. 2A and 2B to a top or bottom portion of the MAC units, while the unum or posit bit strings can be received from side portions of the MAC units via the logic circuitry 222-1 to 222-N and/or the data arbiters 218-1 to 218-N illustrated in FIGS. 2A and 2B, herein.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
    organizing in a matrix a plurality of universal number (unum) or posit bit strings based at least in part on threshold bandwidth ratio or a threshold latency, or both, associated with recursive operations of a plurality of multiply-accumulator (MAC) units coupled to one another;
    receiving, by the MAC, the plurality of unum or posit bit strings organized in the matrix;
    performing, using the MAC units, a plurality of respective recursive operations, wherein iterations of the respective recursive operations are performed using at least one bit string that is a same bit string as was used in a preceding iteration of the respective recursive operations; and
    storing results of iterations of the plurality of respective recursive operations in respective registers coupled to respective MAC units among the plurality of MAC units.

2. The method of claim 1, further comprising performing at least a portion of the plurality of recursive operations contemporaneously.

3. The method of claim 1, wherein the plurality of MAC units comprise circuitry configured to perform the plurality of respective recursive operations and are resident on an application-specific integrated circuit or a field-programmable gate array.

4. The method of claim 1, wherein the operation to organize the plurality of unum or posit bit strings is performed by respective data arbiters coupled to respective MAC units among the plurality of MAC units.

5. The method of claim 1, wherein the plurality of MAC units are organized in a grid formation with respect to one another.

6. The method of claim 1, further comprising:
    receiving, by the plurality of MAC units, commands asserted to a first physical portion of the respective MAC units that resides along a first lateral dimension of the plurality of MAC units; and
    receiving the plurality of unum or posit bit strings by a second physical portion of the respective MAC units that resides along a second lateral dimension of the plurality of MAC units, wherein the first lateral dimension and the second lateral dimension are orthogonal to one another.

7. The method of claim 1, further comprising performing the plurality of respective recursive operations by performing sub-operations associated with the plurality of respective recursive operations by different MAC units among the plurality of MAC units.

8. The method of claim 1, further comprising using at least one same unum or posit bit string as an operand for multiple recursions of the plurality of respective recursive operations.

9. An apparatus, comprising:
a posit multiplier-accumulator (MAC) block comprising a plurality of MAC units organized in a grid formation and configured to:
  receive commands via an interface that resides along a first lateral dimension of the posit MAC block, the commands to cause performance of respective recursive operations using universal number or posit bit strings that are organized in a matrix;
  receive the bit strings along a second lateral dimension of the posit MAC block, the second lateral dimension being substantially orthogonal to the first lateral dimension; and
  perform the respective recursive operations using the received bit strings, wherein iterations of the respective recursive operations are performed using at least one bit string that is a same bit string as was used in a preceding iteration of the respective recursive operations.

10. The apparatus of claim 9, further comprising a data arbiter coupled to the MAC block and configured to organize the bit strings to achieve a threshold bandwidth ratio, a threshold latency, or both during performance of the plurality of respective recursive operations.

11. The apparatus of claim 9, wherein the MAC block further comprises an accumulator register configured to store an intermediate result corresponding to at least one iteration of the respective recursive operations.

12. The apparatus of claim 9, wherein the MAC block is resident on an application-specific integrated circuit or a field-programmable gate array.

13. The apparatus of claim 9, wherein the MAC block is configured to perform a plurality of matrix operations as part of performance of the respective recursive operations using the received bit strings.

14. The apparatus of claim 9, wherein the MAC block is configured to:
  receive the bit strings in a streaming manner; and
  perform the respective recursive operations using the bit strings as the bit strings are streamed through the MAC block.

15. A system, comprising:
a plurality of posit multiplier-accumulator (MAC) units deployed on an application-specific integrated circuit or a field-programmable gate array, the MAC units provisioned with processing resources and coupled to one another in a grid formation; and
respective quire registers coupled to each of the MAC units, wherein each MAC unit among the plurality of MAC units is configured to:
  receive bit strings formatted according to a universal number format or a posit format and organized in a matrix;
  perform a recursive operation using the received bit strings as operands for the recursive operation;
  cause results of iterations of the recursive operation to be accumulated in the respective quire registers;
  determine that the recursive operation is complete; and
  generate a final result of the recursive operation using a result of a final iteration of the recursive operation, a result of an iteration stored in the respective quire registers, or both.

16. The system of claim 15, further comprising a respective systolic data arbiter coupled to each of the MAC units, wherein each of the respective systolic data arbiters are configured to perform operations to organize the bit strings to optimize a bandwidth parameter corresponding to supply of the bit strings to the MAC units.

17. The system of claim 15, wherein each of the respective MAC units are configured as 64-bit by 64-bit MAC units.

18. The system of claim 15, wherein the plurality of MAC units are configured to:
  receive commands to cause performance of the recursive operation via an interface that resides along a first lateral dimension of the MAC units; and
  receive the bit strings along a second lateral dimension of the MAC units, the second lateral dimension being substantially orthogonal to the first lateral dimension.

19. The system of claim 15, wherein at least one of the processing resources is configured to:
  determine a size of the matrix; and
  responsive to the size of the matrix being greater than a threshold size, perform an operation to simplify the matrix such that a resulting matrix is less than the threshold size prior to the plurality of MAC units performing the recursive operation.

20. The system of claim 15, wherein the plurality of MAC units are configured to perform multiple iterations of the recursive operation using at least one bit string that is the same as a preceding iterations of the recursive operation.

* * * * *